3,664,811
PREPARATION OF ALUMINUM HYDRIDE BY HYDROGENATION OF ALUMINUM IN PRESENCE OF A DIALKYL ALUMINUM HYDRIDE

James A. Scruggs, West Haven, Conn., assignor to the United States of America as represented by the Secretary of the Army
No Drawing. Filed Dec. 23, 1968, Ser. No. 786,487
Int. Cl. C01b 6/00
U.S. Cl. 23—204                 4 Claims

ABSTRACT OF THE DISCLOSURE

A novel process for synthesizing aluminum hydride which employs aluminum and a dialkyl aluminum hydride reacted with molecular hydrogen at pressures between 800–2200 p.s.i.a.

BACKGROUND OF THE INVENTION

This invention relates to a novel process for synthesizing aluminum hydride, and in particular to such a process which does not require the use of an expensive hydride.

At present, all processes for synthesizing aluminum hydride require the use of either or both of the expensive hydrides $LiAlH_4$ and $LiBH_4$.

Accordingly, it is the principal object of this invention to provide a economical process for the production of aluminum hydride.

It is a particular object of this invention to provide such a process which does not require the use of an expensive hydride.

SUMMARY OF THE INVENTION

Aluminum hydride may be synthesized from aluminum and a dialkyl aluminum hydride reacted with a molecular hydrogen at pressures between about 800 to about 2200 p.s.i.a.

DESCRIPTION OF THE PREFERRED EMBODIMENTS

Aluminum hydride may be synthesized through the hydrogenolysis of aluminum in presence of a dialkyl aluminum hydride at pressures between about 800 to about 2200 pounds per square inch absolute. A specific example of this novel synthetic process follows:

Reagents
(1) Al
(2) $(CH_3)_2AlH$
(3) Hydrogen (molecular)

Apparatus

The apparatus is a high pressure autoclave of 100 ml. capacity fitted with a glass liner and an "Amco" shaking reactor with a self-contained heating unit.

Procedure 5.85 grams (0.10 mole) or $(CH_3)_2AlH$ are placed in the autoclave together with 3.4 grams (0.126 mole) of aluminum metal and a minor quantity of glass beads (or other finely divided catalyst). The autoclave is then sealed and pressure purged with hydrogen to 1700 p.s.i.a., then heated and agitated at 100° C. after two hours at 100° C. the reaction mixture is cooled. The solids are filtered, washed with dry toluene and then dried under vacuum.

X-ray analyses of the solids indicate the presence of small amounts of aluminum hydride. The particular form found is that with a characteristic maximum absorption in the infrared at 5.8 microns. This is the preferred form of final unsolvated aluminum hydride for propellant application.

Hydrolysis of the solids with $D_2O$ indicates the presence of 6.9% of aluminum hydride based on the HD evolved.

The over-all reactions which are representative for the reactions of this invention may be represented by the following equations:

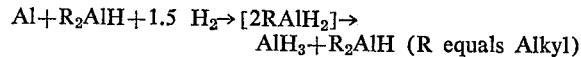

$$AlH_3 + R_2AlH \text{ (R equals Alkyl)}$$

Since the dialkyl aluminum hydride is regenerated, this, in effect, is equivalent to the direct hydrogenation of aluminum.

Solvents other than toluene (e.g., benzene or xylene) may also be employed. However, the solvent must be an aromatic solvent.

The alkyl group may be other than methyl; e.g., isobutyl or ethyl. Alkyl is defined herein to mean any univalent aliphatic hydrocarbon radical symbolized by $C_nH_{2n+1}$, where $n$ is an integer, derived from an alkane by removal of one hydrogen; any aromatic-aliphatic hydrocarbon radical or any alicyclic hydrocarbon radical.

I claim:
1. A process of synthesizing aluminum hydride comprising reacting together, aluminum, a dialkyl aluminum hydride, and hydrogen gas at a temperature of about 100° C. and at a pressure of from about 800 to 2200 pounds per square inch absolute, said dialkyl aluminum hydride containing alkyl groups selected from methyl, ethyl, and isobutyl.
2. The process of claim 1 wherein said pressure is about 1700 pounds per square inch absolute and wherein said dialkyl aluminum hydride is dimethyl aluminum hydride.
3. The process of claim 1 wherein the reaction proceeds for at least about two hours.
4. The process of claim 3 wherein the reaction occurs under agitation, and wherein said reaction proceeds by intimate contact around a finely divided catalyst.

References Cited
UNITED STATES PATENTS

| | | | |
|---|---|---|---|
| 3,387,949 | 6/1968 | Snyder | 23—365 |
| 2,920,935 | 1/1960 | Finholt | 149—87 UX |
| 3,387,949 | 6/1968 | Snyder | 23—365 |

FOREIGN PATENTS

| | | | |
|---|---|---|---|
| 833,646 | 4/1960 | Great Britain | 23—204 |
| 836,792 | 6/1960 | Great Britain | 23—204 |

CARL D. QUARFORTH, Primary Examiner
F. M. GITTES, Assistant Examiner

U.S. Cl. X.R.
23—365; 149—87